Nov. 5, 1957  J. L. KERSEY, JR., ET AL  2,812,191
FOUR WHEEL STEERING FOR MINE TRACTORS
Filed Nov. 25, 1952  2 Sheets-Sheet 2

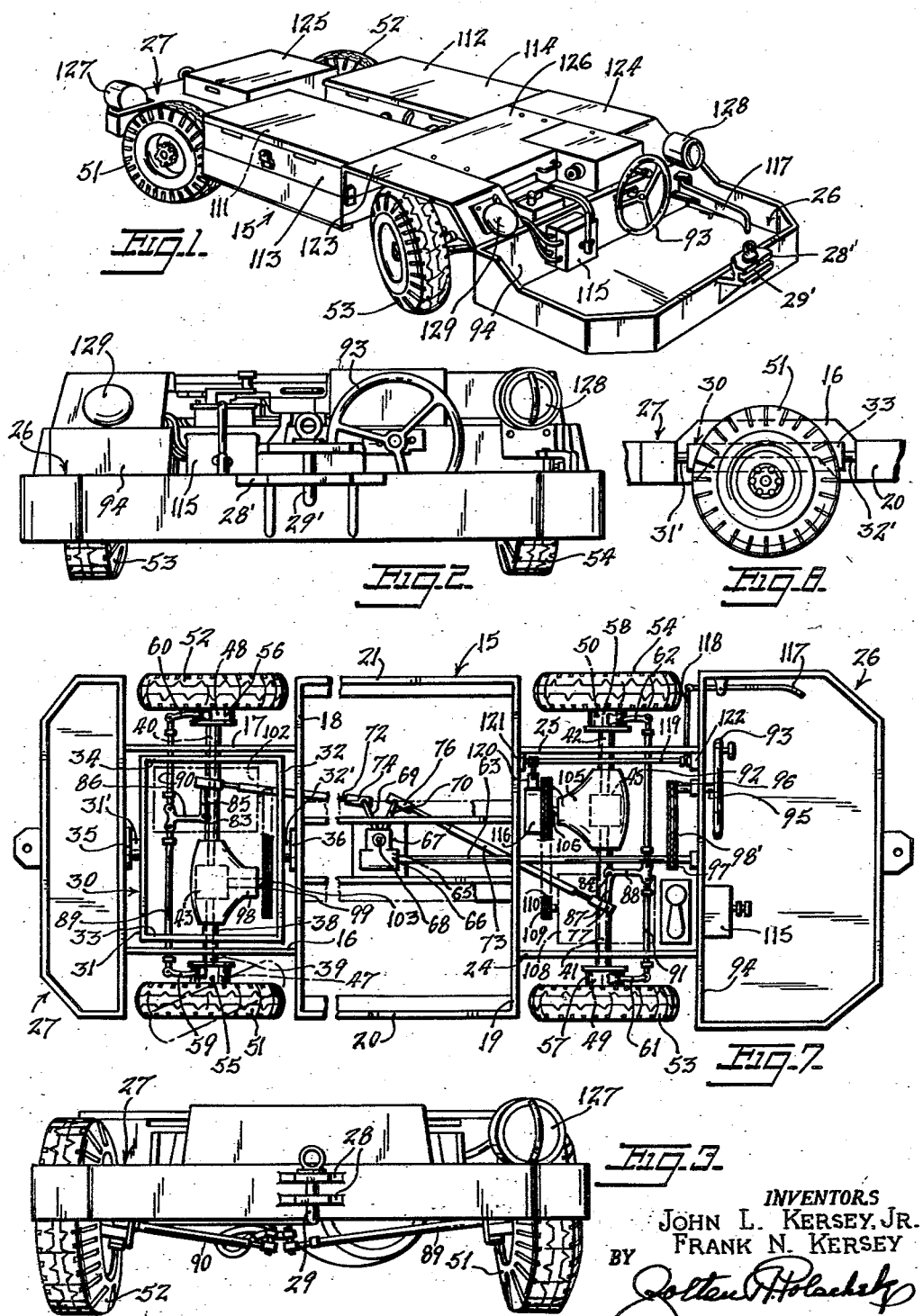

INVENTORS
JOHN L. KERSEY, JR.
FRANK N. KERSEY
BY
ATTORNEY

United States Patent Office 2,812,191
Patented Nov. 5, 1957

2,812,191

FOUR WHEEL STEERING FOR MINE TRACTORS

John L. Kersey, Jr., Bluefield, W. Va., and Frank N. Kersey, Tazewell County, Va.

Application November 25, 1952, Serial No. 322,488

2 Claims. (Cl. 280—91)

This invention relates to new and useful improvements in mine tractors.

More particularly, the present invention proposes the construction of an improved battery-powered, rubber-tired mine tractor having four traction wheels which pull, steer and brake to make a tractor particularly adapted for hauling mine cars in trackless coal mines.

Another object of the present invention proposes forming a mine tractor with a front axle fixed to a sub-frame pivotally connected to the main frame by trunnions in bearings centrally disposed on the main frame to provide the tractor with three-point suspension for travel over rough terrain.

Still further, the present invention proposes constructing a mine tractor with full differential action between the two wheels of each axle and with the wheels of each axle independently and uniformly driven by individual traction motors to assure the tractor will have drawbar pull even when the wheels of one axle are completely deprived of ground contact, such as may occur in travel over rough, chuck-holed roadbeds in coal mines.

As a further object, the present invention proposes arranging the steering gear of the tractor at the center of the tractor with tie rods and steering arms linked symmetrically to the steering gear so that each steering arm travels through the same arc when the steering wheel is turned distributing steering strain equally throughout the system and providing more accurate steering.

The present invention further proposes a novel arrangement of a low self-propelled, battery-operated, mine tractor 24" high overall or less with the operator's deck 12" below the top of the tractor and outside the main frame to provide the safest possible place for the operator and permit use of the tractor in seams as low as 28 inches with clearance to spare.

Another object of the present invention is to provide a mine tractor with a short turning radius and having full power on all wheels for a tight turn under heavy loads.

A still further object of the present invention is to provide a mine tractor with improved battery driven traction motors and drives, the motors having high voltage windings with separate reversing of series fields in each motor and a simple, two-speed oil-immersion drum-type controller to connect or disconnect the motors and batteries and accelerate or decelerate by varying the voltage applied to the motors.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view illustrating the mine tractor of the present invention.

Fig. 2 is a rear end view of the tractor shown in Fig. 1.

Fig. 3 is a front end view.

Fig. 7 is a diagrammatic top plan view similar to Fig. 5 but with parts removed.

Fig. 8 is a fragmentary detail view showing the front axle and sub-frame.

Figure 4:
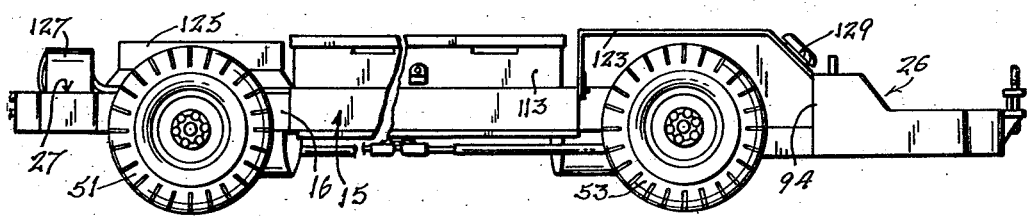
Fig. 4 is a side view.

The mine tractor of the present invention has a symmetrical frame structure including main and subframe sections 15 and 30, respectively. The main frame 15 is preferably fabricated of bar-steel secured together by welding. In the example of the invention illustrated in the drawings, suitable typical stock size of the frame bar steel may be ¾" x 6" bar stock.

Main frame 15 consists of spaced forwardly extending side bars 16 and 17, cross bars 18 and 19 with side bars 20 and 21 and central braces 22 and 23 and spaced rearwardly extending side bars 24 and 25. An operator's deck or platform 26 is secured to the rearward ends of rearwardly extending side bars 24 and 25 and a front platform or deck 27 is fixed to the forward ends of forwardly extending side bars 20 and 21. The operator's deck 26 is dependent from the main frame at the rear end of the tractor. Tractor hitch brackets 28 and 28' are fixed to the front platform 27 and to the rear or operator's platform 26 and clevis pins 29 and 29' complete the hitches.

A sub-frame 30 consisting of cross bars 31 and 32 and side bars 33 and 34 is pivotally secured to the main frame. The cross bars 31 and 32 having trunnions 31' and 32' secured respectively to them and main frame 15 having spaced bearings 35 and 36 centrally disposed on it and fixed to it to receive the trunnions.

An axle 37 is fixed to one end of the main frame being secured to its rearwardly extending side bars 24 and 25. A similar axle 38 is fixed to the sub-frame, being secured to its side bars 33 and 34. The forwardly extending side bars 16 and 17 of main frame 15 are vertically offset or raised (see Fig. 8) above the main frame to permit free pivoting movement of the sub-frame 30 and axle 38 fixed to it.

Each axle has two aligned rotatably mounted axle shafts, front axle 38 having shafts 39 and 40 (see Fig. 7) and rear axle 37 having shafts 41 and 42.

Universal joints 47, 48, 49 and 50 are connected to the other or outboard ends of each of the axle shafts, joints 47 and 48 being connected to the other ends of the front axle shafts 39 and 40 and joints 49 and 50 to the rear axle shafts 41 and 42.

Four rubber-tired traction wheels 51, 52, 53 and 54, having hubs 55, 56, 57 and 58 respectively are also connected to the universal joints, wheels 51 and 52 being connected to the front axle shaft joints 47 and 48 respectively and wheels 53 and 54 to the rear axle shaft joints 49 and 50. The universal joints preferably are disposed in the wheel hubs. These joints 47 to 50 permit transmission of torque throughout the entire steering arc of the traction wheels 51 to 54. Each wheel is thus capable of steering arcs of twenty-five degrees or more providing the tractor with an extremely short turning radius.

Figure 5:
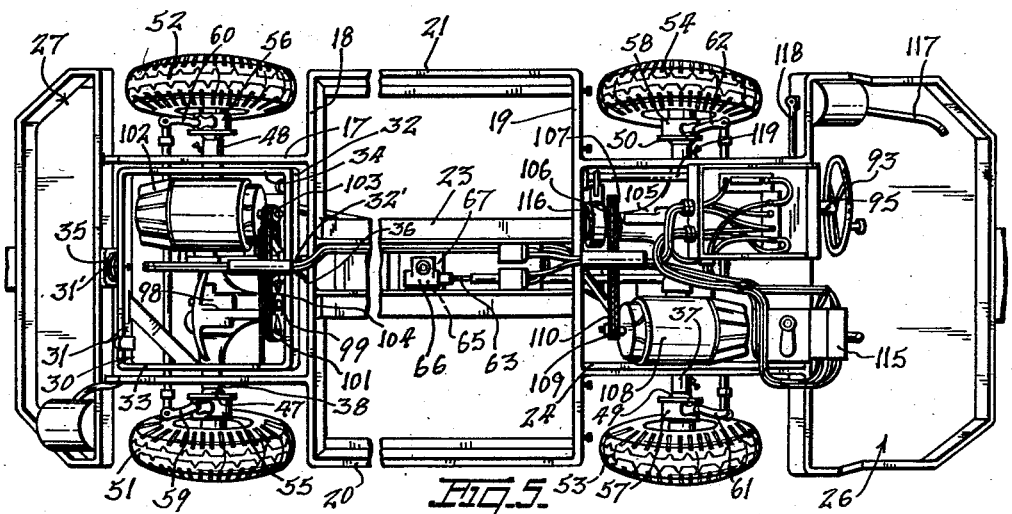
Fig. 5 is a top plan view of the tractor with hoods, fenders and batteries removed.
Figure 6:
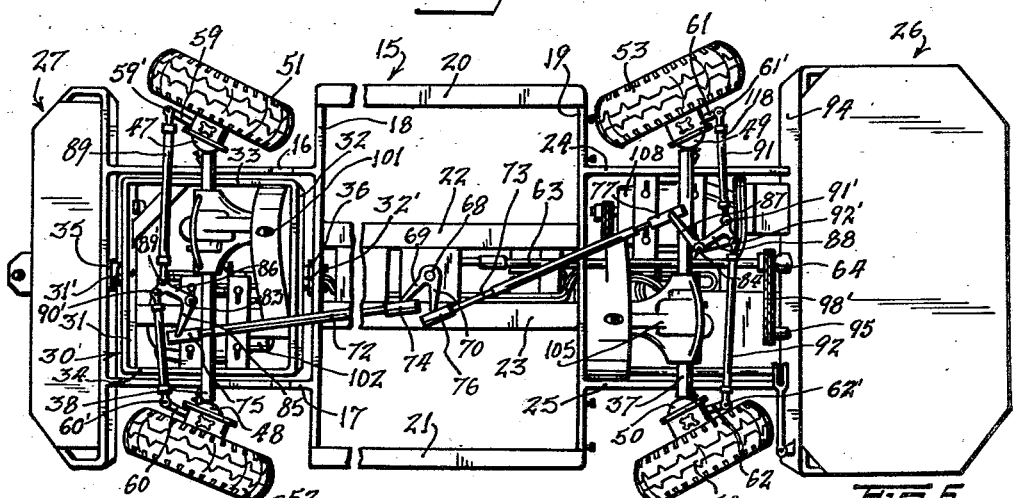
Fig. 6 is a bottom plan view of the structure shown in Fig. 5.

Steering arms, 59, 60, 61 and 62 (see Figs. 5 and 7)

are fastened to the wheel hubs 55 and 58 respectively, each steering arm having one end fastened to the hub of one wheel.

A steering shaft 63 is disposed along the axis of symmetry of the main frame and is rotatably secured to the main frame, the shaft having one end rotatably held in bearing 64 fixed to the rear platform 26 and its other end fastened to a steering gear 65 the housing 66 of which is fixed to plate 67 extending across and secured to the central braces 22 and 23 of the main frame 15.

Figure 9:
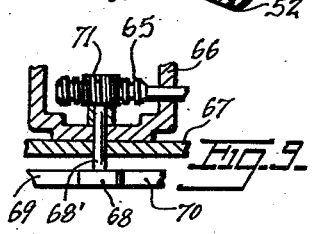
Fig. 9 is a fragmentary detail view partly in section of the center bell crank and steering gear.

Operatively connected with the steering gear 65 at the center of the main frame 15 is a bell crank 68 having two arms 69 and 70, the bell crank being on a stub shaft 68' (Fig. 9) rotatably held in the steering gear housing 66 and having a gear 71 fixed to it in mesh with the steering gear 65. (See Fig. 9).

Figure 10:
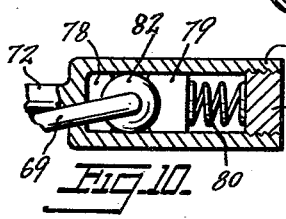
Fig. 10 is another fragmentary sectional detail view showing a ball and socket joint on the end of a steering tie rod.

Two drag links 72 and 73 are connected to the arms 69 and 70 of the bell crank 68. The drag links 72 and 73 have ball and socket joints 74, 75, 76 and 77 on the ends, drag link 72 having joints 74 and 75 and drag link 73 joints 76 and 77. One end of drag link 72 having ball and socket joint 74 is connected with the bell crank arm 69 (see also Fig. 10) and one end of drag link 73, having ball and socket joint 76, is connected with the other bell crank arm 70. The ball and socket joints all are of similar construction having socket segments 78 and 79 (see Fig. 10) a spring 80 and a plug 81. The drag links are connected to the ball 82 as indicated in Fig. 10 where drag link 72 is shown so connected.

Drag links 72 and 73 extend oppositely longitudinally of the frame 15 to each end of the frame, drag link 72 extending toward the front end of the tractor and drag link 73 toward the rear end.

Two additional bell cranks 83 and 84 are provided, one pivotally secured at each end of the frame. Bell crank 83 is pivotally secured to the front axle 38 and bell crank 84 is similarly secured to the rear axle 37.

Bell crank 83 has two arms 85 and 86 and the forwardly extending drag link 72 is connected with arm 85 by ball and socket joint 75 on the forward end of the tie rod.

Similarly, bell crank 84 has two arms 87 and 88 and the rearwardly extending drag link 73 is connected with arm 87 by ball and socket joint 77 on the rearward end of this drag link.

Additional tie rods, 89, 90, 91 and 92, connect the other arms of the bells cranks 83 and 84 at the ends of the frame with the adjacent steering arms 59 to 62 fastened to the wheel hubs. Tie rod 89 has one end pivotally secured to arm 86 of the front bell crank 83 as indicated at 89' and one end similarly secured to the steering arm 59 fastened to the front wheel hub 55 as indicated at 59'. Tie rod 90 also has one end pivotally secured to arm 86 of the front bell crank 83 as indicated at 90' and its other end similarly secured to the steering arm 60 fastened to the other front wheel hub 56 as indicated at 60'.

At the rear of the tractor, tie rod 91 has one end pivotally secured to arm 88 of the rear bell crank 84 as indicated at 91' and its other end similarly secured to the steering arm 61 fastened to the rear wheel hub 57 as indicated at 61'. Tie rod 92 also has one of its ends pivotally secured to arm 88 of the rear bell crank 84 as indicated at 92' and its other end pivotally secured to the steering arm 62 fastened to the other rear wheel hub 58 as indicated at 62'. This arrangement provides an articulated, symmetrical steering system in which each wheel is moved through the same arc of travel with the steering effort equalized.

A steering wheel 93 is operatively connected with the steering shaft 63 being rotatably secured to the front member 94 of the operator's deck 26 by a stub shaft 95. The stub shaft 95 has the steering wheel 93 secured at one end and a sprocket 96 (Fig. 7) fixed to the other end. A companion sprocket 97 is secured to the steering shaft 63 and a roller chain 98' connects the sprockets 96 and 97.

The tractor is driven by electrically operated power means mounted on the frames 15 and 30 and operatively connected with the wheels as will now be described.

Conventional differential gearing shown in dot-dash lines at 43, encased in a housing 98, is interposed between and operatively connects the front axle shafts 39 and 40 with a rotatable propeller shaft 99 for driving said axle shafts in the usual manner of automobile differentials.

Propeller shaft 99 also has secured to one end of it a sprocket 101 and an electric traction motor 102 secured to the sub-frame 30 contains a companion sprocket 103. Roller chain 104 connects the two sprockets 101 and 103. In this manner, the motor 102 is operatively connected with the gears 43 and 44 on the front axle shafts.

Conventional differential gearing shown in dot-dash lines at 45, encased in a housing 105, is similarly interposed between and operatively connects the rear axle shafts 41 and 42 with a rear axle rotatable propeller shaft 106 for driving said rear axle shafts. Also the rear axle propeller shaft 106 has secured to one of its ends a sprocket 107 and an electric traction motor 108 secured to the main frame 15 bears a companion sprocket 109. A roller chain 110 connects the sprockets 107 and 109.

Motors 102 and 108 preferably are glass-insulated, 6-pole, slow-speed, with sealed ball bearings and designed for heavy duty traction with high-voltage windings. Part of the motor speed reduction is obtained in the differentials, generally being in the ratio of 5:1 but the sprockets and chains between the motors and the propeller shafts provide further speed reduction and torque multiplication. Preferably the result is a tractor speed ranging from two to five miles-per-hour depending on the load being drawn. Suitable motors are the series-wound, direct-current type having ratings of three horsepower, 1150 R. P. M., 72 volts and 38.5 amperes each.

Batteries 111 and 112 removably secured to the main frame 15 in the central portion of the frame provide current for the motors and an independent power source for the tractor. The batteries are of the common storage battery (lead-acid) type. A suitable battery is one rated 36 cells, 72 volts, 200 ampere-hours capacity at a six hour rate. Covers 113 and 114 are provided for the batteries on the tractor and when a battery has become discharged it can easily be removed and a fully-charged battery put in its place for continuous operation. Power connections from the batteries to the motors are made by the common plugs and receptacles.

A dual control switch 115 mounted on the front member 94 of the operators deck 26 of the simple two-speed, drum-type, connects and disconnects the motors and batteries at the will of the operator and provides means to vary the voltage to the motors for smooth control of starting, accelerating and running. The control switch 115 separately reverses the series field in each motor thus eliminating undesirable currents and electrical and mechanical losses resulting from the use of a single reversing switch.

Speed control, however, may be obtained either by series and parallel arrangements of the batteries or the individual motor armatures or fields (not shown).

Braking is provided for the wheels of the tractor in the following manner. The propeller shaft 106 of the rear axle is provided with an externally-contracting brake band 116 linked to a brake pedal 117 pivotally secured to the operator's deck 26. The brake band 116 is linked to brake pedal 117 by lever 118, rotatably mounted rod 119 and lever 120. The rotatably mounted rod 119 is rotatably held in bearings 121 and 122 secured to cross bar 19 of the main frame and the front member of the operator's deck 26. Pressure on the brake means frictionally retards the rotation of the propeller shaft 106.

The operators deck 26 is secured to the rear of the main frame and outside the main frame to provide the safest possible place for the operator. It is the lowest point on the tractor and is arranged for easy access in getting on and off the tractor. The operator sits on the deck which is 12 inches below the top of the tractor. The battery covers and fenders 123, and 124 (Fig. 1) and a front and rear cover 125 and 126 form a top deck on the tractor which is only 24 inches above the ground and can be made even lower.

Electric lights 127 and 128 (Fig. 1) are provided at the front and rear of the tractor and a warning bell 129 is mounted on one of the rear fenders 123.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new and desire to secure by United States Letters Patent is:

1. In a steering mechanism for a four-wheel mine tractor, the combination comprising a symmetrical open frame structure rotatably supporting said wheels at four spaced positions thereon, four steering arms each connected respectively at one end thereof to a corresponding one of said wheels, a steering shaft rotatably supported on the frame and disposed substantially along the axis of symmetry of the frame, a steering wheel disposed in a plane perpendicularly to said shaft and operatively connected thereto by chain-driven gear means, a steering gear mounted on one end of said shaft, a first bell crank operatively connected to said steering gear for pivotal actuation thereby and mounted with said steering gear at the center of said frame, two drag links each angularly disposed with respect to said axis, one of the drag links being pivotally connected with one arm of said first bell crank and the other drag link being pivotally connected with the other arm of said first bell crank, said drag links extending at divergent angles and terminating near opposite ends of the frame, two additional bell cranks each pivotally secured to a corresponding adjacent end of said frame each of said additional bell cranks having one arm pivotally connected with the adjacent end of the corresponding drag link, and two pairs of tie rods, means pivotally connecting the adjacent ends of each of said pairs of tie rods to the corresponding free arm of each of the additional bell cranks, the free ends of each of said tie rods being pivotally connected to the corresponding free ends of the steering arms.

2. In a steering mechanism for a four-wheel mine tractor, the combination comprising a symmetrical open frame structure rotatably supporting said wheels at four spaced positions thereon, four steering arms each connected respectively at one end thereof to a corresponding one of said wheels, a steering shaft rotatably supported on the frame and disposed substantially along the axis of symmetry of the frame, a steering wheel operatively connected to the shaft by chain-driven gear means, a steering gear mounted on one end of said shaft, a first bell crank operatively connected to said steering gear for pivotal actuation thereby and mounted with said steering gear at the center of said frame, two drag links each angularly disposed with respect to said axis, one of the drag links being pivotally connected with one arm of said first bell crank and the other drag link being pivotally connected with the other arm of said first bell crank, said drag links extending oppositely at divergent angles and terminating near opposite ends of the frame, two additional bell cranks each pivotally secured to a corresponding adjacent end of said frame, each of said additional bell cranks having one arm pivotally connected with the adjacent end of the corresponding drag link, and two pairs of tie rods, means pivotally connecting the adjacent ends of each of said pairs of tie rods to the corresponding free arm of each of the additional bell cranks, the free ends of each of said tie rods being pivotally connected to the corresponding free ends of the steering arms.

References Cited in the file of this patent

UNITED STATES PATENTS

| | | |
|---|---|---|
| 1,041,449 | Douglas | Oct. 15, 1912 |
| 1,170,270 | Johnston | Feb. 1, 1916 |
| 1,219,276 | Fageol | Mar. 13, 1917 |
| 1,308,314 | Wilcox | July 1, 1919 |
| 1,665,865 | Templin | Apr. 10, 1928 |
| 1,804,713 | Stockton | May 12, 1931 |
| 1,937,839 | Parrett | Dec. 5, 1933 |
| 2,091,821 | Kless | Aug. 31, 1937 |
| 2,156,601 | Mosling et al. | May 2, 1939 |
| 2,316,521 | Lee | Apr. 13, 1943 |
| 2,323,817 | Lee | July 6, 1943 |
| 2,362,636 | Joy | Nov. 14, 1944 |
| 2,488,520 | Beck | Nov. 22, 1949 |
| 2,571,180 | Ball | Oct. 16, 1951 |
| 2,618,491 | Lee | Nov. 18, 1952 |
| 2,694,460 | Lehmann | Nov. 16, 1954 |

FOREIGN PATENTS

| | | |
|---|---|---|
| 674,249 | Germany | Apr. 11, 1939 |
| 811,546 | Germany | Aug. 20, 1951 |
| 254,705 | Italy | Aug. 25, 1927 |